United States Patent Office 3,433,557
Patented Mar. 18, 1969

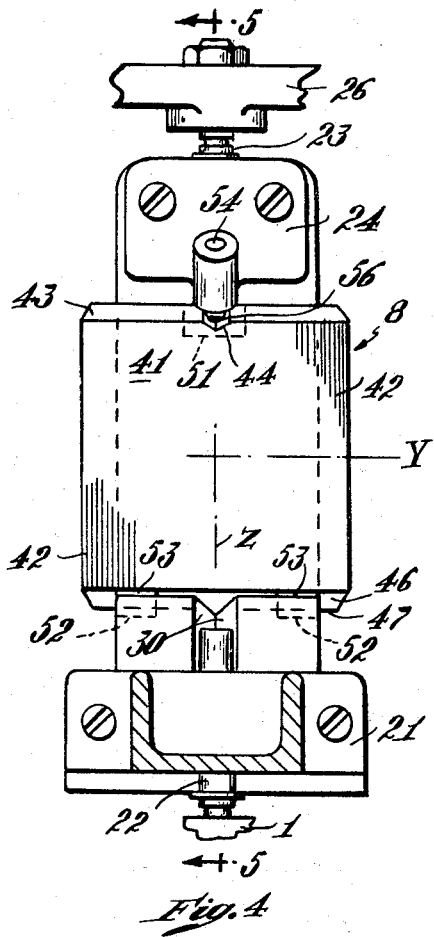
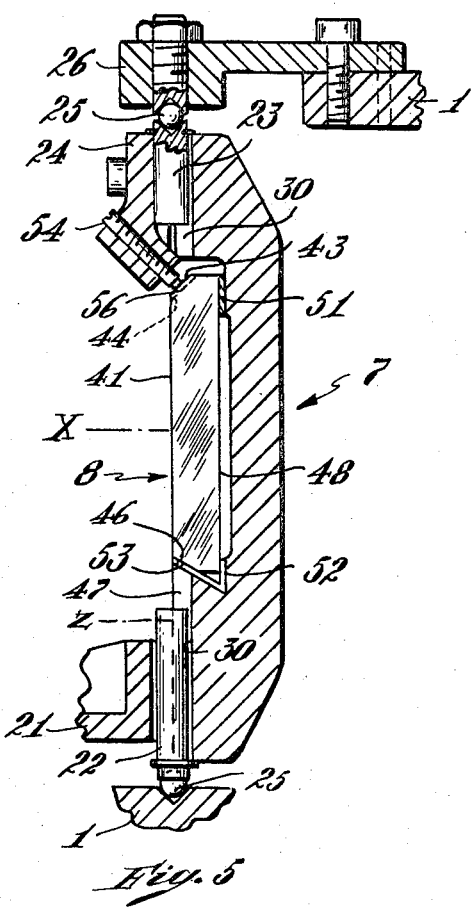
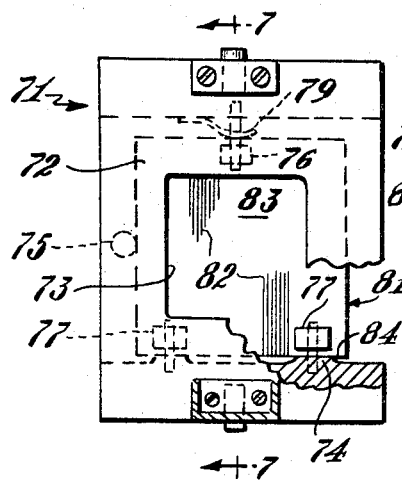
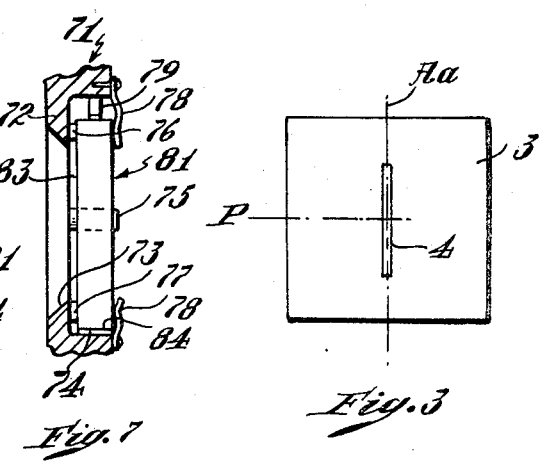

3,433,557
MOUNTING FOR INTERCHANGEABLE GRATINGS
Paul M. McPherson, Acton, Mass., assignor, by mesne assignments, to McPherson Instrument Corporation, a corporation of Delaware
Filed Nov. 13, 1964, Ser. No. 410,915
U.S. Cl. 350—162          8 Claims
Int. Cl. G02b 5/18; G01j 3/12

ABSTRACT OF THE DISCLOSURE

A mounting arrangement for mounting interchangeable gratings in an optical spectrometer to provide for manual insertion of the interchangeable gratings without losing the precise orientation required for proper operation of the instrument. The grating is formed with a straightedge at a fixed angle to the axis of the rulings. The grating also includes a positioning plane surface at a fixed angle to the plane of the rulings. The mount includes a guide slot for receiving the straightedge and three contact pads defining a reference plane, both the guide means and the reference plane being precisely oriented with respect to the principal optical path of the instrument. The relationship between the reference plane formed by the contact pads and the guide means is the same as the relationship between the plane positioning surface and the straightedge on the grating. A spring loaded pressure member holds the mounted grating firmly in place and the planes and straightedge ensure precise reproducible positioning.

---

Figure 1:
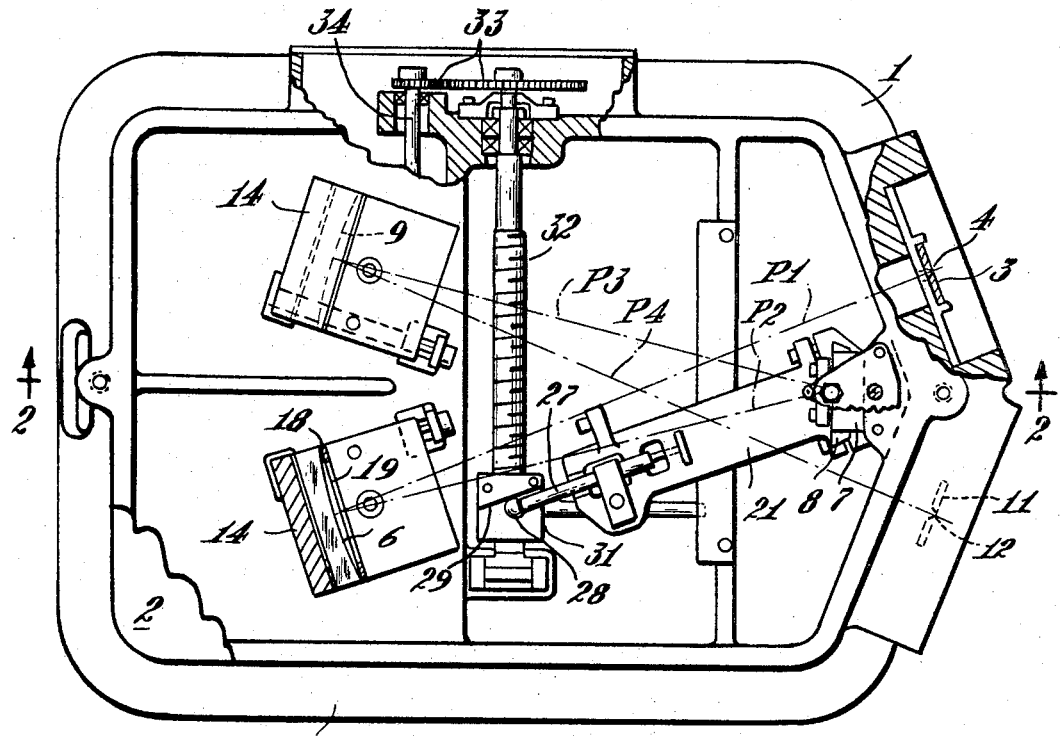

This invention relates to optical instruments such as spectrometers, spectrographs and monochromators using ruled gratings which disperse incident light in spectra.

Diffraction gratings, for example, generally are glass blanks having one optically finished and aluminum coated surface on which there are microscopic parallel rulings in the range of 75 to 175,000 lines per inch. The value of the grating in the instruments mentioned is dependent upon the very precise orientation of the grating in the optical system of the instrument.

As a simple example, the optical system of a monochromator includes an entrance slit, a plane grating and optics for directing light along a principal path from the entrance slit, to the grating and thence to the exit slit. Three mutually perpendicular axes are associated with the plane grating—the X axis normal to the plane of the grating, the Y axis perpendicular to the rulings, and the Z axis parallel to the rulings, both the Y and the Z axes being in the plane of the rulings. The orientation of these axes with respect to the optical path and principal plane of the optical system must be exceedingly precise, within seconds of arc in some instances.

Hitherto, the grating has been mounted in a holder, which in turn has been mounted in the optical instrument. The holder has been provided with adjustments about the three axes for precise positioning of the grating. Not only are grating holders expensive, but also positioning the grating in them represents a substantial part of their cost. An expert may require one or two days to align a grating in a holder. In many instances the cost of using more than one grating is prohibitive and effectively limits the usefulness of the instrument.

The object of the present invention is to provide a way of placing a grating in an optical system by means of a support permanently mounted in the system into which interchangeable gratings may be inserted by hand, without adjustment, and yet with the critical orientation required, so that a number of gratings can be used in the instrument without the high cost of time and money involved with prior grating holders.

The present invention relates to a receptacle and gratings for use in optical systems dispersing light in spectra, said system having an optical path lying in a principal plane, said grating having rulings defining three mutually perpendicular axes and having a straightedge at a fixed angle to said rulings, and said grating having means defining a plane with a predetermined angular relation to the plane of the rulings, said receptacle being mounted on said optical path and comprising guide means defining a straightedge for slidingly receiving and positioning said grating straightedge so as to precisely orient one of said grating axes with respect to said principal plane, at least three contact means defining a reference plane, and resilient means for yieldingly urging said grating plane against said contact means and said guide means so as precisely to orient the other two grating axes with respect to said principal plane and optical path, whereby each of the interchangeable gratings may be inserted in said receptacle manually with the same precision of orientation in respect to the principal plane and optical path.

Figure 2:
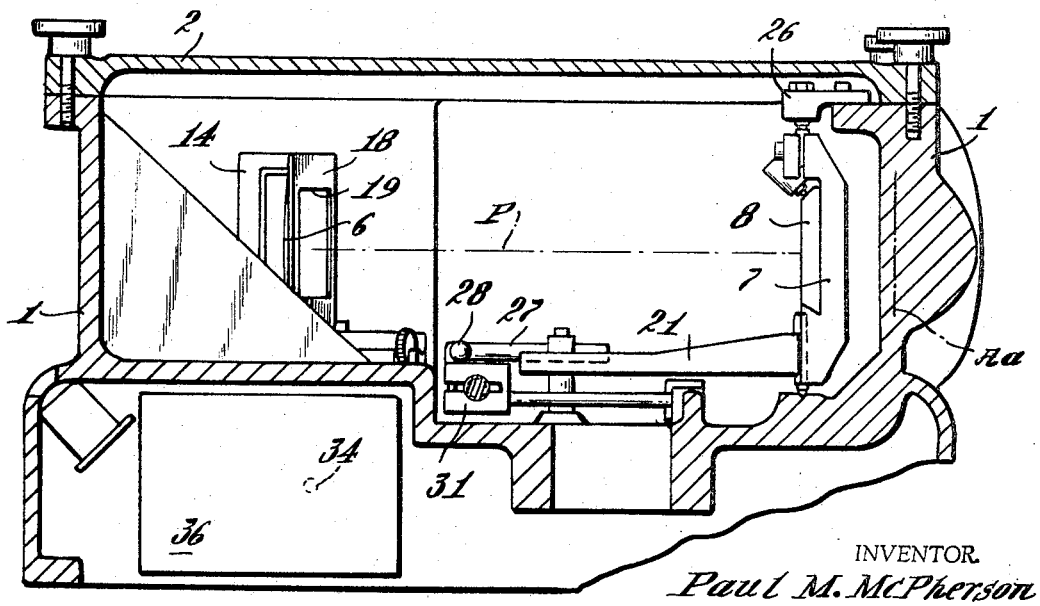

For the purpose of illustration typical embodiments of the invention are disclosed in the accompanying drawings in which:

FIG. 1 is a plan view, partly broken away, of a monochromator in which one form of grating is mounted;
FIG. 2 is a section on line 2—2 of FIG. 1;
FIG. 3 is a front elevation of the entrance slit;
FIG. 4 is an enlarged elevation of the grating of FIGS. 1 and 2 and its support;
FIG. 5 is a section on line 5—5 of FIG. 4;
FIG. 6 is an elevation of another form of grating and support; and
FIG. 7 is a section on line 7—7 of FIG. 6, partly broken away.

The monochromator shown in FIGS. 1 and 2 comprises a base 1 with a cover 2. On or within the base are mounted a mask 3 with a light entrance slit 4, a first curved mirror 6, a receptacle 7 for a grating 8, a second curved mirror 9, and a mask 11 with a light exit slit 12 like the mask 3 and slit 4. The foregoing optical system defines a principal path with portions P1, P2, P3 and P4 lying in a horizontal plane P. As shown in FIG. 3 the narrow, vertical entrance slit 4, typically from 10 microns to 2 mm. wide, defines an axis Aa normal to the plane P of the principal path. Light passing through the entrance slit 4 forms on path P1 a sheet beam along path P1 which is collimated by the first mirror 6 and directed on path P2 to the grating 8 from which it is reflected in spectra on path P3 to the second reflector 9. The second reflector 9 focuses the spectra on the exit mask 11, the exit slit 12 passing a very narrow band of one spectrum to a photocell (not shown) which measures the energy of light. As will be explained in greater detail, the receptacle 7 for the grating 8 is pivotally mounted to rotate the grating and cause the spectra to scan across the exit slit.

The mirrors 6 and 9 comprise glass blocks clamped in holders 14 which are adjustably attached to the base 1. In front of each mirror is a mask 18 with a rectangular opening 19. The mirrors are optically finished with a concave spherical surface with focal lengths, for example, of twelve inches for the collimating mirror 6 and twelve inches for the focussing mirror 9.

The grating receptacle 7 is clamped at its bottom to an arm 21 so as to hold a vertical pivot rod 22 therebetween (see FIGS. 4 and 5). A similar pivot rod 23 is clamped by a block 24 at the top of the receptacle. Verticle V-grooves 30 at the top and bottom of the grating receptacle precisely locate the axes of the pivot rods 22 and 23 coincident with the Z axis of the grating 8. Conical recesses at the ends of these rods engage a lower ball bearing 25 on the base 1 and an upper ball bearing 25 in the conical recess of a bearing screw on a bracket 26 fixed to the base 1. The end of the arm 21 carries a rod 27 terminating in a ball 28. The ball is held by a spring against the face 29 of a nut 31 on a screw 32. The screw 32 is driven through a gear train 33 by the shaft 34 of a reversing motorized gear box 36 so as to swing the arm 21 through an arc of about 40° from the rest position shown in FIG. 1 and thereby rotate the grating 8 and cause the spectra dispersed by the grating to scan across the exit slit 12. When the arm 21 and grating 8 are in rest position, the central image of the entrance slit 4 is reflected by the mirrors 6 and 9 and the grating 8 on the exit slit 12.

The grating 8 shown enlarged in FIGS. 4 and 5 comprises a generally rectangular glass blank having an optically finished plane front face 41 on which is an aluminum coating with vertical rulings 42. The ruled face defines three mutually perpendicular axes—the X axis normal to the plane of the face, the Y axis lying horizontally in the plane of the face, and the Z axis extending vertically in the plane of the face parallel to the rulings. Interchangeable gratings suitable for use in the above described optical system have a face two inches square with 150, 300, 600, 1200 or 2400 ruled lines per millimeter. Other gratings with different spacing may be used as well as gratings blazed to intensify dispersion at selected bands of the spectra. It is a primary object of the present invention to make possible the use of a large number of such different gratings in one optical system to permit examination or experimentation in a wide range of the light spectrum from the vacuum ultraviolet through the visible into the infrared.

The upper edge 43 of the grating is bevelled and has a V-shaped notch 44 at its center. The lower edge 46 is bevelled to define a straightedge optically finished precisely perpendicular to the rulings 42 and the Z axis, and therefore parallel to the Y axis. The back surface 48 of the grating 8 reverse of the ruled surface 41 is optically finished to a plane parallel to the ruled surface 41.

The grating receptacle 7 forms a socket including an upper metal pad 51 and two lower pads having vertical portions 52 and inclined portions 53. These pads may be attached to or formed integrally with the receptacle 7. The upper pad 51 and the two lower pad portions 52 are optically finished and so positioned on the receptacle as to precisely define a reference plane parallel to the acceptance axis Aa of the entrance slit A4 and normal to the horizontal plane P of the optical path P1–P4. The inclined pad portions 53 define a straightedge parallel to the plane P and lying in a plane to which the acceptance axis Aa is normal. That is, along the principal path P1–P4 the receptacle straightedge defined by the pad portions 53 is in the same angular relation to the acceptance axis Aa as the grating straightedge 46 bears to the grating rulings 42.

The receptacle is adapted to receive the grating with the lower edge 46 of the grating sliding along the pad portions 53 and the reverse face 48 of the grating sliding along the pads 51 and 52. The clamping block 24 at the top of the receptacle 7 carries a screw which has at its lower end a captive spring urged ball 56 adapted to snap fit into the groove 44 in the upper bevelled edge 43 of the grating. The resilient force of the ball 56 in the groove 44 not only centers the grating in the receptacle, but also seats the grating against the receptacle pads. The thrust of the ball has a horizontal component which yieldingly urges the grating against the upper pad 51, and a vertical component which urges the lower bevelled edge 46 of the grating against the inclined pad portions 53. A wedging action of the inclined portions 53 includes a horizontal component which urges the lower part of the grating against the pads 52.

When the grating is so held in the receptacle, the receptacle straightedge fixes the rotative position of the X axis in this case parallel to the principal plane P within ±10′ (ten minutes) of arc. Thus the angular relation of the grating straightedge to the rulings is extremely critical and must be accurate within 10′ (ten minutes) of arc and preferably 3′ or 4′ or even seconds of arc. At the same time the pads 51 and 52 defined the receptacle reference plane, by engagement with the rear face 48 of the grating fixes the rotative position of the Y and Z axes with respect to the principal plane P within 10′ (ten minutes) of arc and preferably not more than 1′ (one minute) of arc.

Because the points of contract formed by the pads are opposed to each other and to the spring urged ball, bending movements on the grating are negligible and deforming stress is minimized. Nevertheless, gratings with various rulings and which are physically interchangeable with each other may be manually removed and replaced in a matter of moments with the necessary high precision of orientation and without further adjustment.

While the grating and receptacle described above are particularly well suited for manual interchange it is also possible to use the grating and receptacle of FIGS. 6 and 7 in the optical system described or similar systems.

In FIGS. 6 and 7 the grating 81 is rectangular with rulings 82 on an optically finished plane surface 83. The rulings 82 define the same three mutually perpendicular X, Y and Z axes as do the rulings 42 of FIGS. 4 and 5. The lower edge 84 of the grating is optically finished to form a straightedge normal to the rulings and parallel to the Y axis of the ruled surface 83. The receptacle 71 has a front wall 72 forming a window 73 opening on the ruled face 83 of the grating. Below the window are two upstanding, optically finished pads 74 defining a straightedge receiving the grating straightedge 84. Inside the window are an upper pad 76 and two lower pads 77 having optically finished surfaces defining a reference plane normal to the optical path P and parallel to the acceptance axis Aa. The modified receptacle 71 is adapted to receive the grating 81 with the grating straightedge 84 bearing on the receptacle straightedge defined by the pads 74, and with the ruled, optically finished plane face 83 of the grating bearing on the pads 76 and 77 defining the reference plane spring fingers 78 on the receptacle opposed to the pads 76 and 77 yieldingly urge the ruled grating face 83 against the pads 76 and 77. A like spring finger on the receptacle urges the grating straightedge 84 against the pads 74 thereby orienting X, Y and Z axes of the grating precisely with respect to the principal optical path P1–P4 and the acceptance axis of the optical system. A stop pin 75 positions the grating centrally in the receptacle where it is held frictionally by the several spring fingers.

It should be understood that the present disclosure is for the purpose of illustration only and that this invention includes all modifications and equivalents which fall within the scope of the appended claims. Thus, while a scanning monochromator has been shown, the receptacle and interchangeable grating of this invention are quite useful in other instruments such as spectrographs having a fixed or moving grating.

I claim:

1. A receptacle for use in optical systems using interchangeable gratings to disperse light in spectra, said system having an optical path lying in a principal plane, said gratings having a series of rulings defining three mutually perpendicular axes, a Z axis parallel to the direction of extension of each of said rulings, a Y axis parallel to the direction of distribution of said series of rulings, together defining a face plane, and an X axis normal to said face plane, said gratings having a straightedge in a fixed angular relationship to said Z axis in a plane parallel to said YZ plane and a planar positioning surface with a predetermined angular relationship to said face plane, said receptacle being mounted on said optical path and comprising, guide means defining a straightedge for receiving and positioning said grating straightedge, at least three contact means defining a reference plane, said contact means being positioned with respect to said guide means such that the positional relationship between said guide means and said reference plane is substantially identical to the positional relationship between said grating straightedge and said grating positioning surface, and resilient means for yieldingly urging said positioning surface against said contact means and said grating straightedge against said guide means to precisely orient said grating on all three axes with respect to said principal plane and optical path, whereby each of the interchangeable gratings may be inserted in said receptacle manually with the same precision of orientation in respect to the principal plane and optical path.

2. An optical system using interchangeable gratings to disperse light in spectra, said gratings having a series of rulings defining three mutually perpendicular axes, a Z axis parallel to the direction of extension of each of said rulings, a Y axis parallel to the direction of distribution of said series of rulings, together defining a face plane, and an X axis normal to said face plane, said gratings having a straightedge in a fixed angular relationship to said Z axis in a plane parallel to said YZ plane and a planar positioning surface with a predetermined angular relationship to said face plane, said system comprising, an optical path lying in a principal plane,
a receptacle mounted on said optical path and including guide means defining a straightedge for receiving and positioning said grating straightedge,
at least three contact means defining a reference plane, said contact means being positioned with respect to said guide means such that the positional relationship between said guide means and the reference plane is substantially identical to the positional relationship between said grating straightedge and said grating positioning surface, and
resilient means for yieldingly urging said positioning surface against said contact means and said grating straightedge against said guide means to precisely orient said grating on all three axes with respect to said principal plane and optical path, whereby each of the interchangeable gratings may be inserted in said receptacle manually with the same precision of orientation in respect to the principal plane and optical path.

3. A grating for use in an optical system dispersing light in spectra, said system having an optical path lying in a principal plane and having a grating receptacle lying on the principal path and comprising, guide means defining a straightedge for receiving the grating and means holding the grating against contact means defining a reference plane, said grating comprising, a surface having a series of rulings thereon defining three mutually perpendicular axes, a Z axis parallel to the direction of extension of each of said rulings, a Y axis parallel to the direction of distribution of said series of rulings, together defining a face plane, and an X axis normal to said face plane, said grating having a straightedge in a fixed angular relationship to said Z axis in a plane parallel to said YZ plane, said fixed angular relationship being accurate to within at least ten minutes of arc.

4. Optical apparatus for dispersing light spectra from an optical grating having a series of rulings defining three mutually perpendicular axes, a Z axis parallel to the direction of extension of each of said rulings, a Y axis parallel to the direction of distribution of said series of rulings, together defining a face plane, and an X axis normal to said face plane, said grating having a straightedge in a fixed angular relationship to said Z axis in a plane parallel to said YZ plane and a planar positioning surface with a predetermined angular relationship to said face plane, said apparatus comprising, a rigid base,
an optical system defining an optical path lying in a principal plane and having an acceptance axis normal to said principal plane,
a grating receptacle mounted on said base on said path, said receptacle comprising guide means precisely defining a straightedge for receiving and positioning said grating straightedge such that said Z axis is normal to said principal plane,
at least three contact means precisely defining a reference plane with a predetremined angular relationship to said principal plane, and
resilient means for yieldingly urging said planar positioning surface against said contact means and said grating straightedge against said guide means, whereby interchangeable gratings may be inserted in said receptacle manually to precisely orient the three axes of the grating with respect to the principal plane.

5. Apparatus in accordance with claim 4 wherein said receptacle guide means and two of said contact means form a socket wedging said grating therebetween.

6. Apparatus in accordance with claim 4 wherein the angular relationship between said grating straightedge and said Z axis is accurate to at least within ten minutes of arc.

7. Apparatus in accordance with claim 4 wherein said grating includes a surface inclined at an angle with respect to said planar positioning surface and wherein said resilient means includes means for exerting a force on said inclined surface in such a direction that said position defining surface is urged against said contact means and said straightedge is urged against said guide means.

8. Apparatus in accordance with claim 7 wherein said inclined surface includes a groove receiving said yielding means to center the grating within the receptacle.

References Cited

UNITED STATES PATENTS 904,066 11/1908 Jacob _____ 350—287
3,011,391 12/1961 Fastie.

RONALD L. WIBERT, *Primary Examiner.*

V. P. McGRAW, *Assistant Examiner.*

U.S. Cl. X.R.

356—100